United States Patent

Larka

[15] 3,681,750
[45] Aug. 1, 1972

[54] OBJECT DETECTION APPARATUS
[72] Inventor: Vincent E. Larka, Burlington, Mass.
[73] Assignee: GTE Laboratories Incorporated
[22] Filed: July 2, 1970
[21] Appl. No.: 51,758

[52] U.S. Cl. ................340/16 R, 340/31 R, 340/261
[51] Int. Cl. .............................................H04b 11/00
[58] Field of Search ........340/1 R, 1 T, 6 R, 16 R, 15, 340/34, 31 R, 258 D, 261

[56] References Cited

UNITED STATES PATENTS

| | | | |
|---|---|---|---|
| 3,159,807 | 12/1964 | Asbury, Sr. | 340/6 |
| 3,253,457 | 5/1966 | Pakala et al. | 340/15 |
| 3,268,856 | 8/1966 | Wallen, Jr. | 340/15 |
| 3,158,835 | 11/1964 | Hipkins | 340/34 |

*Primary Examiner*—Richard A. Farley
*Attorney*—Irving M. Kriegsman

[57] ABSTRACT

A passive ultrasonic vehicle detection apparatus for use with a vehicle such as an automobile, truck, or bus for detecting and indicating the presence of other vehicles in predetermined regions rearward of the subject vehicle, for example, in travel lanes adjacent to the travel lane of the subject vehicle or in so-called "blind" zones of the subject vehicle. When a vehicle is present in one of the adjacent lanes or in a blind zone, signals including ultrasonic signals which are generated inherently by the vehicle, for example, due to a combination of factors such as engine and body vibrations, and engine and tire noises, are received by a frusto-conical signal-receiving horn mounted in a rearward location of the subject vehicle and applied to a piezoelectric crystal transducer. The piezoelectric transducer has a predetermined resonant frequency equal to the frequency of particular ultrasonic signals generated inherently by all existing engine-driven road vehicles. The piezoelectric transducer operates in response to the various signals received from the frusto-conical signal-receiving horn to produce an electrical output voltage which is greatest for ultrasonic signals of the predetermined resonant frequency. The output voltage produced by the piezoelectric transducer is then applied to a resonant circuit tuned to the predetermined resonant frequency to achieve the desired system bandwidth.

The output signal produced by the resonant circuit is amplified and applied to an astable multivibrator which operates to produce a train of output pulses for periodically applying the vehicle battery voltage to an integrator circuit. The integrator circuit operates to integrate the voltage pulses received thereby and to operate a driver circuit when a predetermined threshold voltage level is achieved. The driver circuit operates a lamp or other indicator to indicate the presence of the vehicle in the adjacent lane or blind zone.

8 Claims, 3 Drawing Figures

INVENTOR
VINCENT E. LARKA
BY Peter Xiarhos

3,681,750

OBJECT DETECTION APPARATUS

BACKGROUND OF THE INVENTION

The present invention relates to an object detection apparatus and, more particularly, to a passive ultrasonic vehicle-detection apparatus for use with a vehicle for detecting and indicating the presence of other vehicles in predetermined regions or zones rearward of the subject vehicle.

It is often necessary that the operator of a vehicle such as an automobile, truck, or bus know whether another vehicle is approaching the subject vehicle from behind in an adjacent lane or is present in a "blind" zone before making a lane change or taking other appropriate action. This type of information is particularly useful to operators of many types of trucks and buses where interior rear view mirrors, such as commonly used in automobiles in conjunction with side rear view mirrors for detecting vehicles approaching from the rear, cannot be used due to the size or construction of the vehicle. In such cases, reliance is presently placed almost entirely on one or more exterior side rear view mirrors located on each side of the vehicle.

While side rear view mirrors, whether for automobiles, trucks, or buses, provide a certain amount of useful information to an operator, the size and location of such mirrors severely restrict the rear field of view to a very small region. The rear field of view that side rear view mirrors are capable of providing is even further limited under poor weather conditions, as in rain, snow, or fog. In addition, side rear view mirrors require frequent adjustment to be fully effective.

A variety of other object detection arrangements have been proposed heretofore in the prior art for use with a vehicle for detecting and indicating the presence of vehicles approaching the subject vehicle from the rear. In one such system which is active in nature, a transmitter-receiver arrangement is carried by a vehicle for transmitting sonic or ultrasonic time-spaced or continuous-wave signals in a rearward direction and for receiving and processing the signals reflected from an object present in the path of the transmitted signal, such as a vehicle, thereby to provide an indication to the operator of the presence of the object. A significant disadvantage of such a system is that it is unable to discriminate between the particular target which it is desired to detect, that is, an unseen vehicle approaching from the rear, and fixed objects such as signs, fences, trees, and the like. Thus, all objects appear to an operator as targets. While it has been proposed in the prior art to solve the abovementioned discrimination problem by means of apparatus such as Doppler-shift apparatus, such apparatus is complicated and very costly, particularly when considered for use in high-volume, mass-produced vehicles, such as automobiles and trucks, where cost is an important factor. Another disadvantage of active systems of the above type is that they require both transmitting and receiving apparatus, thereby adding to system costs.

In addition to the abovedescribed active systems, it has been proposed in the prior art, for example, in burglar alarm systems, to detect the presence of an unauthorized individual in a predetermined area by detecting a particular frequency or frequencies present in noises produced by the individual while in the predetermined area. A significant disadvantage of systems of this type, when considered for use in vehicle-detection applications, is that focusing is limited inasmuch as sources outside or beyond the particular area of interest may also cause a system response. In addition, in those systems where the time duration or amplitude of the noises to be detected are not significant factors to be monitored, improper system operation can occur due to random or spurious low-level background noises or due to shock stimuli.

BRIEF SUMMARY OF THE INVENTION

Briefly, in accordance with the present invention, a passive ultrasonic object detection apparatus is provided for use with a first object for detecting and indicating the presence of another object in a predetermined region adjacent to the first object and which avoids many of the shortcomings and problems associated with prior art object detection apparatus such as described hereinabove. As will become readily apparent hereinafter, the primary object and purpose of the present invention is to detect and indicate the presence of objects which are inherently capable of generating signals including ultrasonic signals, for example, automotive vehicles. The ultrasonic object detection apparatus of the present invention is passive in nature in that it does not require an active transmitter, carried either by a subject object or by an object to be detected. Thus, where the objects of interest are vehicles, many of the object discrimination problems associated with prior art active object detection systems are avoided.

The passive ultrasonic object detection apparatus in accordance with the present invention includes a signal-receiving means associated with a first object for receiving the signals inherently generated by another object when the other object is present in a predetermined region of surveillance adjacent to the first object. Signals inherently generated by the other object are received by the signal-receiving means only when the other object is present in the predetermined region of surveillance, thereby preventing the occurrence of a response by the apparatus of the invention due to an object outside or beyond the particular area of interest, that is, outside or beyond the predetermined region of surveillance. The geometrical configuration of the predetermined region of surveillance is determined by the signal-receiving means. The various signals, including ultrasonic signals, received by the signal-receiving means when an object to be detected is present in the predetermined region of surveillance adjacent to the first object are applied to a processing means coupled to the signal-receiving means. The processing means operates to process the ultrasonic signals received from the signal-receiving means to provide an indication of the presence of the other object in the predetermined region of surveillance.

Since, in accordance with the present invention, ultrasonic signals are detected and processed, these ultrasonic signals being produced in the case of road vehicles regardless of the nature of existing weather conditions, many of the problems associated with the use of vehicular rear-view mirrors or other prior art visual aids in bad weather conditions, and "blind-spot"

problems as well, may be effectively avoided by the present invention. In addition, the passive ultrasonic object detection apparatus of the invention may be employed effectively by objects such as trucks and busses regardless of size or nature of construction.

BRIEF DESCRIPTION OF THE DRAWING

Additional objects, features, and advantages of passive ultrasonic object detection apparatus in accordance with the present invention will be apparent from the following detailed discussion and the accompanying drawing in which.

Figure 1:
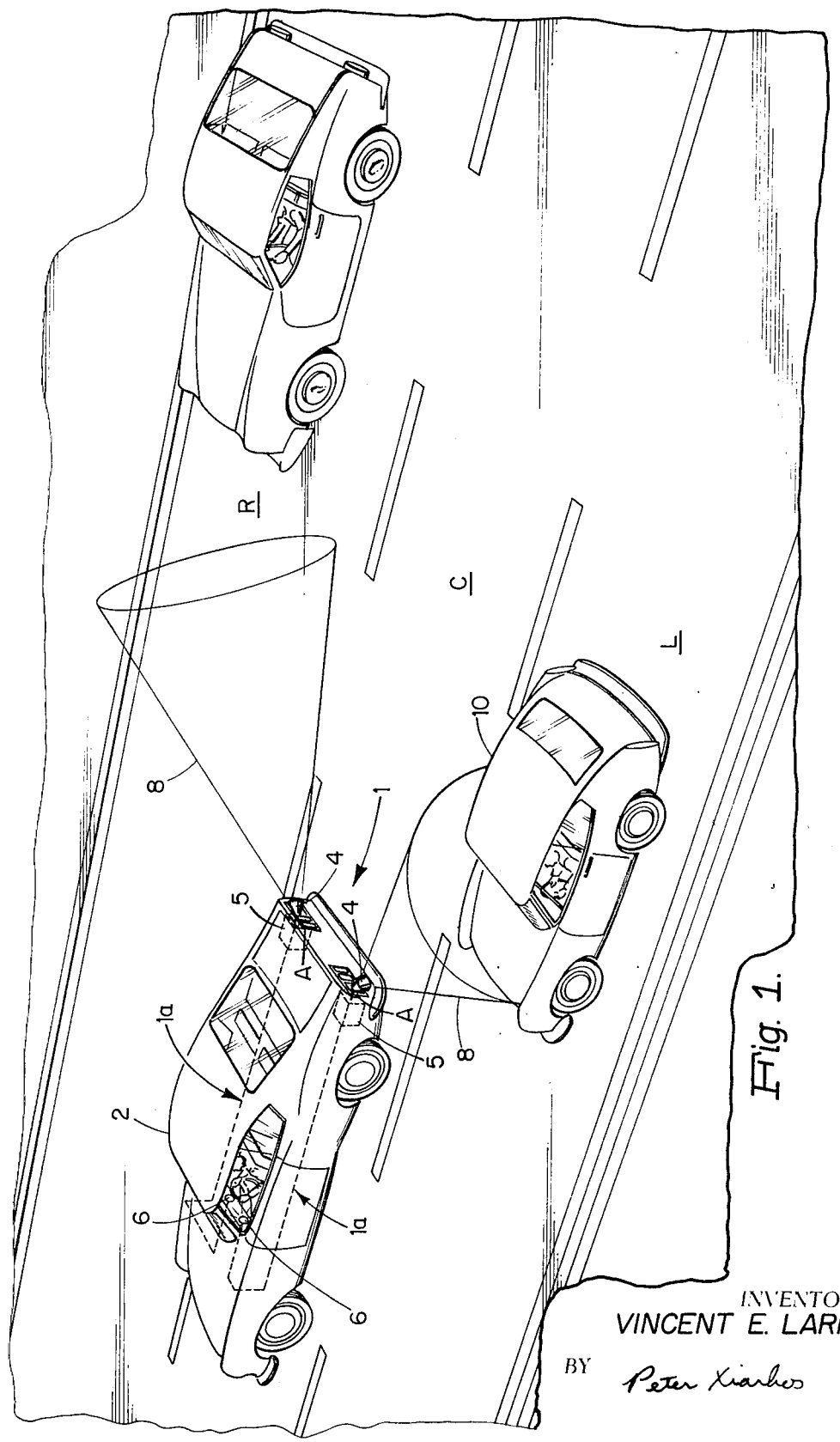
FIG. 1 illustrates a passive ultrasonic vehicle detection apparatus in accordance with the present invention as employed with an automobile to detect and indicate the presence of other automobiles in travel lanes adjacent the travel lane of the subject automobile or in "blind" zones of the subject automobile.
Figure 2:
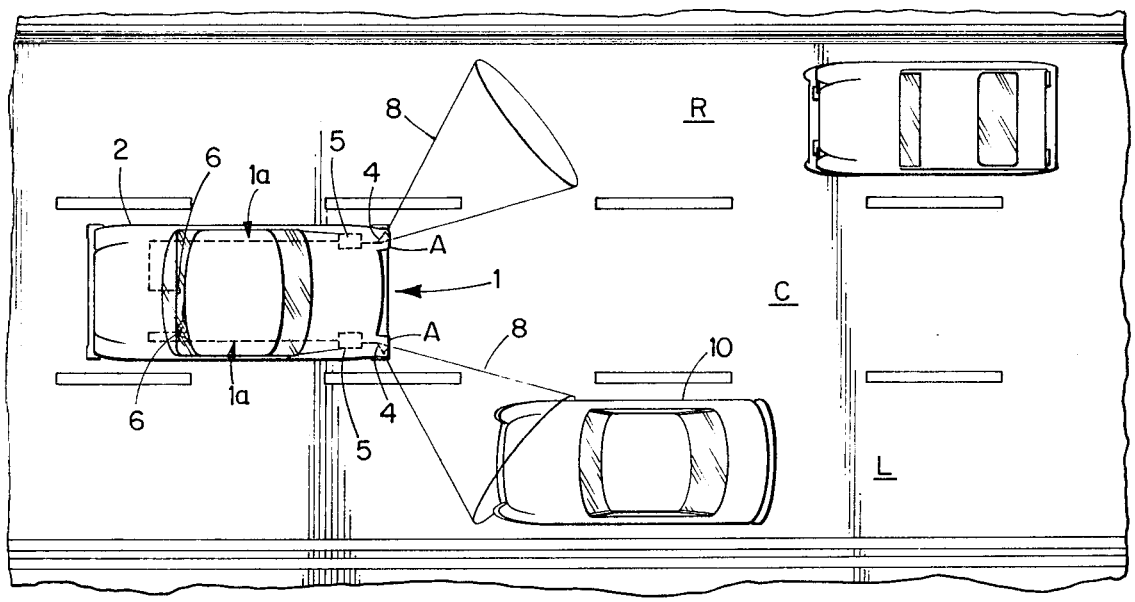
FIG. 2 is a top view of the arrangement shown in FIG. 1.

GENERAL DESCRIPTION — FIGS. 1 and 2

Referring to FIGS. 1 and 2, there is shown a passive ultrasonic vehicle detection apparatus 1 in accordance with the present invention as employed with an automobile 2. As indicated in FIGS. 1 and 2, the passive ultrasonic vehicle detection apparatus 1 comprises a pair of identical passive ultrasonic receiving arrangements 1a, each comprising, in a series arrangement, a signal-receiving horn member 4, an ultrasonic signal processing circuit 5, and an indicator 6. Although the signal-receiving horn members 4 may assume a variety of possible physical configurations and be physically mounted at a variety of rearward locations of the automobile 2, it is preferred that each of the signal-receiving horn members 4 have a frusto-conical (or "frustum") configuration, as shown more clearly in FIG. 3, and be positioned within a small opening provided in the corresponding rear tail-light assembly A. Furthermore, to provide optimum effectiveness, the signal-receiving horn members 4 should cant outwardly slightly from the travel lane C of the automobile 2 toward the adjacent right and left travel lanes R and L. With the above configuration and positioning for the signal-receiving horn members 4, corresponding zones or regions of surveillance 8 of essentially the same configuration as the signal-receiving horn members 4 are established rearwardly of the automobile 2 and adjacent the right and left lanes R and L and enveloping any existing rear "blind" zones of the automobile 2.

As will be described in detail hereinafter, when an approaching vehicle enters one of the regions of surveillance 8, such as an automobile 10 as shown in FIGS. 1 and 2, and only at such time, the corresponding signal-receiving horn member 4 receives various signals including ultrasonic signals which are generated naturally and inherently by the vehicle. These signals are produced, for example, due to a combination of factors such as engine and body vibrations, engine, tire, and wind noises and, in general, any other noises associated with the vehicle. Thus, the signal-receiving horn member 4 "listens" for a vehicle present in its associated region of surveillance 8. The various signals received by the signal-receiving horn member 4 from the vehicle are applied to the associated ultrasonic signal processing circuit 5, and the ultrasonic signals are processed thereby to energize its associated indicator 6 to indicate to the operator of the automobile 2 the presence of the vehicle in the associated region of surveillance 8. The indicators 6 shown in FIGS. 1 and 2 may be placed within the instrument panel or on the dashboard of the automobile 2 or in any other suitable location. The ultrasonic signal processing circuit 5 employed in each of the passive ultrasonic receiving arrangements 1a of FIGS. 1 and 2 is shown in greater detail in FIG. 3.

Figure 3:
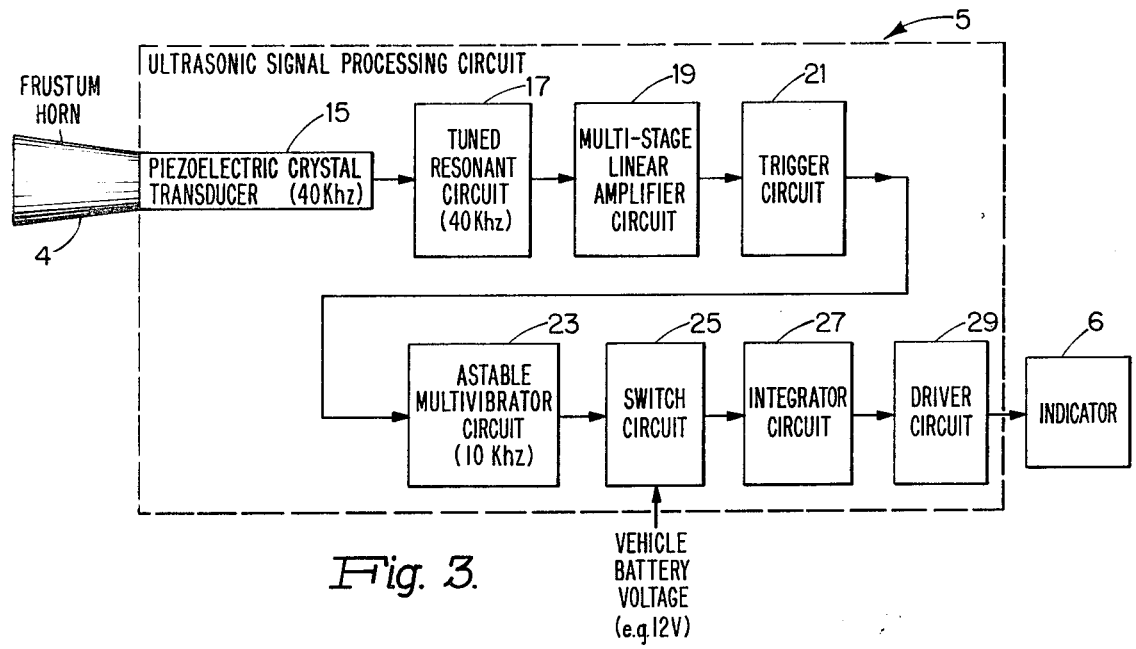
FIG. 3 is a detailed block diagram of a passive ultrasonic receiving arrangement employed in the passive ultrasonic vehicle detection apparatus of FIG. 1.

As shown in FIG. 3, the ultrasonic signal processing circuit 5 includes a piezoelectric crystal transducer 15, a tuned resonant circuit 17, a multi-stage linear amplifier circuit 19, a trigger circuit 21, as astable multivibrator circuit 23, a switch circuit 25, an integrator circuit 27, and a driver circuit 29. The operation of the ultrasonic signal processing circuit 5 of FIG. 3 is as follows.

When a vehicle such as an automobile enters the region of surveillance 8 of the signal-receiving horn member 4, for example, as indicated by the automobile 10 in FIGS. 1 and 2, the various signals including ultrasonic signals produced naturally and inherently by the vehicle are received by the signal-receiving horn member 4. As indicated previously and as shown in FIG. 3, the signal-receiving horn member 4 preferably has a frusto-conical (frustum) configuration. Some typical dimensions for this particular configuration are: inside diameter of larger opening, approximately 1.75 inches; inside diameter of smaller opening, approximately 0.75 inch; and length of central longitudinal axis, approximately 3 inches. For these particular dimensions, and referring to FIGS. 1 and 2, a cone-shaped region of surveillance is produced which is approximately 30 feet long (measured along the central longitudinal axis) and which has a diameter at the larger (base) end of approximately 15 feet. The various signals received by the signal-receiving horn member 4 are applied to the piezoelectric crystal transducer 15. To insure that the piezoelectric crystal transducer 15 receives all of the signals collected by the signal-receiving horn member 4, it is physically positioned adjacent the smaller of the two openings of the signal-receiving horn member 4.

The piezoelectric crystal transducer 15 preferably has a fundamental excitation or resonant frequency of 40 kilohertz. This particular value of excitation frequency is preferred inasmuch as all existing engine-driven road vehicles, including automobiles, trucks, buses, motorcycles, and motorbikes, naturally generate ultrasonic signals (among other signals, both ultrasonic and non-ultrasonic) having a frequency of 40 kilohertz. In addition, a 40 kilohertz resonant frequency is sufficiently removed from the audio frequency range so as to preclude undesirable operation of the ultrasonic signal processing circuit 5 by spurious signals in the audio range. However, since ultrasonic signals of other frequencies are also generated naturally by existing engine-driven road vehicles, for example, 50–60 kilohertz, it is contemplated that the piezoelectric crystal transducer 15 have a fundamental excitation frequency other than 40 kilohertz. A particularly suitable 40 kilohertz piezoelectric crystal transducer and mounting structure therefor which may be employed in the present invention is sold by Massa, Inc., Hingham, Massachusetts, under the designation MK 109.

The 40 kilohertz piezoelectric crystal transducer 15 operates in response to the signals received via the signal-receiving horn member 4 to produce an output voltage which is greatest for ultrasonic signals of an excitation frequency of 40 kilohertz. Natural harmonics of the ultrasonic signals of the fundamental 40 kilohertz excitation frequency also cause an output response but to a lesser degree than the ultrasonic signals of the 40 kilohertz frequency; non-harmonic signals also produce an output response but to a lesser degree than the 40 kilohertz ultrasonic signals or harmonics thereof. Since the response-frequency bandwidth of the piezoelectric transducer 15 is difficult to control or predict, and may vary from transducer to transducer due to physical dimensioning problems associated with the manufacture of piezoelectric crystal transducers, the output voltage produced by the 40 kilohertz piezoelectric crystal transducer 15 is applied to the tuned resonant circuit 17, having a tuned resonant frequency of 40 kilohertz, which provides an electrical output signal of the desired system bandwidth. By way of example, the tuned circuit 17 may include a 40 millihenry coil having one end connected in series with the piezoelectric transducer 15 and an 82 kilohm resistor connected between the other end of the 40 millihenry coil and ground potential, this arrangement providing a 6 kilohertz, 6 db bandwidth centered at 40 kilohertz. The output signal from the tuned circuit 17 is then applied to the multi-stage linear amplifier circuit 19 and amplified thereby to a level suitable for further processing. The multistage linear amplifier circuit 19 may typically comprise three conventional transistor class A amplifier stages and a conventional transistor class C amplifier stage arranged in cascade, with the components of the various amplifier stages being selected to provide a 100 db($10^5$) voltage gain.

The amplified output signal produced by the multistage linear amplifier circuit 19 is applied to the trigger circuit 21 to produce a trigger signal for triggering the astable multivibrator circuit 23 to its pulse-producing state. For most effective operation, the trigger circuit 21, which may be implemented by a variety of circuits well known to those skilled in the art, has an input threshold voltage level associated therewith which must be exceeded before producing a trigger signal. In this fashion, low-level background noises are prevented from causing a system output response. The astable multivibrator circuit 23 may be of a conventional transistor design including a pair of transistors and operable to produce a train of square-wave output pulses in response to a trigger signal. A particularly suitable and convenient frequency for the train of output pulses produced by the astable multivibrator circuit 23 is 10 kilohertz, although suitable operation can also be achieved with slight modification of the subsequent circuitry for other frequencies between 1 kilohertz and 1 megahertz.

The 10 kilohertz output pulse train produced by the astable multivibrator circuit 23 is then applied to the switch circuit 25, of a conventional design, to switch the vehicle battery voltage, typically 12 volts DC, on and off at a 10 kilohertz rate and to apply the 12-volt pulses so produced to the integrator circuit 27. The integrator circuit 27, which typically includes a conventional parallel-RC circuit, for example, a 4.7 kilohm resistor in parallel with 35 microfarad capacitor, is arranged to integrate the 10 kilohertz 12-volt pulses produced by the switch circuit 25 over a period of time equal to the time that a vehicle is in the region of surveillance established by the signal-receiving horn member 4 and presenting ultrasonic signals to the signal-receiving horn member 4, and to produce an output signal for energizing the driver circuit 29 when the voltage developed across the capacitor reaches a predetermined threshold voltage which is indicative of the presence of a vehicle in the surveillance region. The threshold voltage is established at a value, for example, 4–5 volts, which is above that which would be produced by the integrator circuit 27 as a result of integrating pulses initiated by spurious, random, or background noises received by the signal-receiving horn member 4 or by shock acoustical stimuli received by the signal-receiving horn member 4 and of sufficient amplitude to cause operation of the trigger circuit 21. Thus, the driver circuit 29, which may be a conventional transistorized driver circuit of well-known design, is energized only when a vehicle is present in the region of surveillance 8 associated with the signal-receiving horn member 4. When the driver circuit 29 is energized by the integrator circuit 27, the indicator 6 is operated to indicate to the operator that a vehicle is present in the associated region of surveillance 8. The indicator 6 may be a warning light, audible buzzer, or any other suitable indicating device.

MODIFICATIONS

Although a vehicle detection apparatus 1 including two passive ultrasonic receiving arrangements 1a has been described hereinabove, it is apparent that fewer or more than two passive ultrasonic arrangements may be used in certain applications. For example, it may be desired in certain applications to employ only one passive ultrasonic receiving arrangement, for example, for detecting and indicating to the operator of a vehicle the presence of rearward approaching vehicles in the same lane as the subject vehicle. In other applications, it may be desired to add a center-lane passive ultrasonic receiving arrangement to the right an left lane passive ultrasonic receiving arrangements described hereinbefore. Other modifications and changes will be obvious to those skilled in the art without departing from the invention as defined by the appended claims.

What is claimed is:

1. A passive ultrasonic object detection apparatus associated with a first object for detecting and indicating the presence of another object in a region of surveillance adjacent to the first object, said another object inherently generating signals including ultrasonic signals, said apparatus comprising signal-receiving means for receiving the signals inherently generated by said another object when said another object is present in the predetermined region of surveillance adjacent to said first object, said signal-receiving means receiving said signals only when said another object is present in said predetermined region of surveillance, said predetermined region of surveillance having a geometrical configuration determined by said signal-receiving means; and processing means coupled to the signal-receiving means for processing the ultrasonic signals received by the signal-receiving means to provide an indication of the presence of said another object in the predetermined region of surveillance, said processing means comprising an ultrasonic transducer having a predetermined resonant frequency and arranged to receive the signals received by the signal-receiving means, said ultrasonic transducer being operable in response to the ultrasonic signals received from the signal-receiving means to produce an output voltage which is greatest for ultrasonic signals of the predetermined resonant frequency; and circuit means connected to the ultrasonic transducer and operable in response to the output voltage produced by the ultrasonic transducer to produce an output signal having a predetermined amplitude and duration indicative of the presence of said another object in the predetermined region of surveillance, said circuit means comprising tuned resonant circuit means connected to the ultrasonic transducer and having a tuned resonant frequency equal to the resonant frequency of the ultrasonic transducer, said tuned resonant circuit means being operable in response to the output voltage produced by the ultrasonic transducer to produce an output signal of a predetermined bandwidth; amplifier means connected to the tuned resonant circuit means and operable to amplify the output signal produced by the tuned resonant circuit means to produce an amplified output signal having a predetermined voltage gain; pulse circuit means connected to the amplifier means and operative in response to the amplified output signal produced by the amplifier means to produce a series of output pulses of a predetermined frequency; dc voltage supply means adapted to produce a dc voltage of a predetermined amplitude; switching circuit means connected to the pulse circuit means and to the dc voltage supply means and operative in response to the series of output pulses produced by the pulse circuit means to switch the dc voltage produced by the dc voltage circuit means on and off at the predetermined frequency of the series of output pulses produced by the pulse circuit means thereby to produce a series of output pulses of the same frequency as the series of output pulses produced by the pulse circuit means and having an amplitude equal to the amplitude of the dc voltage produced by the dc voltage supply means; and integrator circuit means connected to the switching circuit means and operable in response to the series of output pulses produced by the switching circuit means to integrate said pulses and to produce an output signal having a predetermined amplitude and duration indicative of the presence of said another object in the predetermined region of surveillance.

2. A passive ultrasonic object detection apparatus in accordance with claim 1, further comprising:
output means connected to the integrator circuit means and operable in response to the output signal produced by the integrator circuit means to provide a sensible indication of the presence of said another object in the predetermined region of surveillance.

3. A passive ultrasonic object detection apparatus in accordance with claim 1 wherein said ultrasonic transducer is a piezoelectric crystal transducer.

4. A passive ultrasonic object detection apparatus in accordance with claim 3 wherein said pulse circuit includes an astable multivibrator circuit.

5. A passive ultrasonic object detection apparatus in accordance with claim 4 wherein:
said signal-receiving means includes a horn member having a frustum configuration; and
said predetermined region of surveillance has essentially a frustum configuration.

6. A passive ultrasonic object detection apparatus in accordance with claim 5, further comprising:
output means connected to the integrator circuit means and operable in response to the output signal produced by the integrator circuit means to provide a sensible indication of the presence of said another object in the predetermined region of surveillance.

7. A passive ultrasonic object detection apparatus in accordance with claim 6 wherein said another object is an engine-driven vehicle.

8. A passive ultrasonic object detection apparatus in accordance with claim 6 wherein said first object and said another object are both engine-driven vehicles and wherein said dc voltage supply means includes a storage battery carried by said first engine-driven vehicle.

* * * * *